United States Patent
McCollam et al.

[11] Patent Number: 6,143,675
[45] Date of Patent: Nov. 7, 2000

[54] POROUS COMPOSITE

[75] Inventors: Francis Michael John McCollam, Fife; Norman Ernest Clough, Lanarkshire, both of United Kingdom

[73] Assignee: W. L. Gore & Associates (UK) Ltd., United Kingdom

[21] Appl. No.: 08/973,945
[22] PCT Filed: Jun. 6, 1996
[86] PCT No.: PCT/GB96/01340
§ 371 Date: Jul. 23, 1998
§ 102(e) Date: Jul. 23, 1998
[87] PCT Pub. No.: WO96/40510
PCT Pub. Date: Dec. 19, 1996

[30] Foreign Application Priority Data

Jun. 7, 1995 [GB] United Kingdom .................... 9511518
Mar. 30, 1996 [GB] United Kingdom .................... 9606823

[51] Int. Cl.$^7$ ................. B32B 3/26; C08J 7/04; G03G 15/20
[52] U.S. Cl. .................. 442/221; 156/77; 264/46.4; 427/195; 428/313.5; 428/316.6; 442/246
[58] Field of Search ............................... 428/213, 218, 428/313.5, 313.6; 442/221, 246; 156/77; 264/46.4; 427/195

[56] References Cited

U.S. PATENT DOCUMENTS

| | | | |
|---|---|---|---|
| 3,831,553 | 8/1974 | Thettu | 118/266 |
| 4,336,766 | 6/1982 | Maher et al. | 118/60 |
| 4,385,093 | 5/1983 | Hubis | 428/316.6 |
| 4,443,657 | 4/1984 | Hill et al. | 174/110 FC |
| 4,547,424 | 10/1985 | Suzuki | 428/316.6 |
| 5,628,786 | 5/1997 | Banas et al. | 623/1 |

FOREIGN PATENT DOCUMENTS

| | | |
|---|---|---|
| 0 174 474 | 3/1986 | European Pat. Off. . |
| 0 391 660 | 9/1989 | European Pat. Off. . |
| 0 479 564 A2 | 4/1992 | European Pat. Off. . |
| 0 525 630 A2 | 2/1993 | European Pat. Off. . |
| 3735371 A1 | 5/1989 | Germany . |
| 62-178992 | 2/1986 | Japan . |
| 1 355 373 | 6/1974 | United Kingdom . |
| 2 242 431 | 10/1991 | United Kingdom . |
| 2 261 400 | 5/1993 | United Kingdom . |
| 2 285 768 | 7/1995 | United Kingdom . |
| WO 94/19029 | 9/1994 | WIPO . |

*Primary Examiner*—Blaine Copenheaver
*Attorney, Agent, or Firm*—Carol A Lewis White

[57] ABSTRACT

A porous composite laminate material comprises a layer (4) of expanded polytetrafluoroethylene (PTFE) membrane, and a layer (2) of non-expanded porous PTFE attached thereto. The non-expanded porous PTFE layer may be a sintered porous PTFE produced by sintering granular-type PTFE particles to form a porous integral network of interconnected particles; and may be produced in situ by spray application onto the membrane followed by baking. Modifiers including unsintered fine powder PTFE, thermoplastic fluorinated organic polymer, a low molecular weight PTFE and mixtures thereof may be included. The expanded PTFE membrane can be in sheet form or in the form of expanded PTFE fibres woven into a fabric. The laminate may be used for oiling and cleaning high temperature fuser rolls in a photocopying machine, or as a filter.

28 Claims, 4 Drawing Sheets

POROUS COMPOSITE

FIELD OF THE INVENTION

The present invention relates to a porous composite material formed from polytetrafluoroethylene (PTFE) which has applications in a number of fields, particularly in the copying machine field, but also in the field of gas or liquid filtration, and in medicine. The invention also relates to oil transfer components containing the porous composite material for use in copying machines.

The term "copying machine" as used herein relates to machines which employ heated fuser rolls, for example printer devices such as plain-paper copying machines, fax machines, laser printers etc.

BACKGROUND OF THE INVENTION

In a plain-paper copying machine, toner images applied to the surface of paper or other recording medium are fixated by application of heat and pressure. In certain plain-paper copying machines fixation is accomplished by passing the image-bearing recording medium between a hot thermal fixation roll and a pressure roll. When this type of thermal fixation device is used the toner material is directly contacted by a roll surface and a portion of the toner usually becomes adhered to the roll surface. On material may be redeposited on the recording medium resulting in undesirable offset images, stains, or smears; or in severe cases the recording medium may stick to the adhered toner material on the roll and become wrapped around the roll. To counter these problems, materials having good release properties such as silicone rubber or polytetrafluoroethylene are often used for the roll surfaces. Although improving performance of the thermal fixation devices, use of silicone rubber or polytetrafluoroethylene roll surfaces alone does not eliminate the problem. Toner pick-up by the rolls can be controlled by coating the surface of at least one of the rolls with a liquid release agent, such as a silicone oil. It is important that the release liquid be applied uniformly and in precise quantities to the surface of the roll. Too little liquid or non-uniform surface coverage, will not prevent the toner from being picked up from the paper and deposited on the roll. On the other hand, excessive quantities of the release liquid may cause silicone rubber roll surfaces to swell and wrinkle, thus producing copies of unacceptable quality.

Various devices are known in the art for applying liquid release agent to one of the rolls of the fuser system, such as described in U.S. Pat. No. 3,831,553 and European Patent Publication 479564. However, the feature these systems have in common is the provision of a reservoir for holding a quantity of liquid release agent and an oil permeation control layer which is interposed between the reservoir and the roll of the fuser system for controlling the amount of oil which is transferred on to the roll of the fuser system. Various materials are known as the oil permeation control layer, such as porous polytetrafluoroethylene film as disclosed in Japanese Patent Specification No. 62-178992.

British published patent application 2242431 discloses a sintered porous polytetrafluoroethylene structure used as a filter in industrial filtration. The porous polytetrafluoroethylene material is produced by fusing particles of polytetrafluoroethylene such as to form a porous integral network of interconnected particles. The disclosure of this patent specification is incorporated herein.

British published patent application 2261400 (International Patent Publication W093/08512) discloses the use of such sintered porous polytetrafluoroethylene (PTFE) material as an oil transfer component in a copying machine and particularly as an oil permeation control layer to control the amount of release agent applied to the roll in the fuser system. Patent publication EP0174474 (Sumitomo) shows a release oil applicator which comprises a porous body formed of PTFE held in a housing. The PTFE body is saturated with silicone oil and may be formed with various cross-sections.

U.S. Pat. No. 4,336,766 (Maher) shows the use of a compound wick assembly formed from a relatively thick layer of Nomex felt and a relatively thin layer thereof. The thick layer acts as a feeder to convey oil to the thinner layer.

The function of the oil reservoir is to hold quantities of liquid release agent for application to the roll of the fuser system. The reservoir may be pre-loaded with a predetermined quantity of release oil. This is referred to as an "oil-filled device", and is generally discarded once the supply of liquid release agent is used up. Alternatively, the device may be an "oil-fed" device which is supplied with liquid release agent on a continuous basis from a supply device. In both cases, the reservoir has to hold a finite quantity of liquid release agent and should have the ability to supply the liquid release agent at a suitable rate via the oil permeation control layer to the surface of the roll in the fuser system. However, it may be difficult to combine these properties in a single material. For example, a reservoir material having a high void volume and thus a high porosity which enables it to hold relatively large quantities of liquid release agent, may have a relatively low resistance to flow of the liquid release agent, leading to over-supply of release agent. This may be obviated by the presence of the permeation control layer, which controls the rate of delivery of release agent to the roll.

Whilst the sintered porous PTFE material referred to in GB2261400 has good properties as regards oil permeation control and toner wiping from the roll of the fuser system, it has certain drawbacks particularly when the material is to be used as a continuous thin web of sheet material. A continuous web is supplied wound around a feed spool and the web is slowly advanced past the fuser system roll onto a take-up spool during operation. The thin web has a tendency to tear unless care is taken in handling it. Also, webs of good strength tend to have lower porosities so that the oil retention capacity is limited.

It is an object of the present invention to provide an oil transfer component which mitigates the problems associated with known reservoir materials.

SUMMARY OF THE INVENTION

It has now been surprisingly found that a material having good mechanical properties in combination with good release agent retention and release agent delivery properties may be obtained from a porous composite material formed of an expanded PTFE membrane having attached thereto a layer of a non-expanded porous PTFE, especially a sintered porous PTFE.

Thus, one aspect of the present invention provides a porous composite material which comprises;

expanded polytetrafluoroethylene membrane; and a layer of a non-expanded porous polytetrafluoroethylene attached to the expanded PTFE membrane;

the layer of non-expanded porous PTFE being a sintered PTFE network.

The layer of non-expanded sintered porous PTFE is generally made by a sintering process wherein PTFE solids are heated to high temperature to form a porous matrix. One such material is available under the Zitex trademark (Norton Chemplast, New Jersey, USA) and comprises fibrous PTFE wherein PTFE fibres are bonded into a porous matrix. Such materials may be formed by mixing cellulosic or proteinaceous materials with PTFE and heating in oxygen to high temperatures to burn out or carbonize cellulosic or proteinaceous material and to sinter the PTFE (see U.S. Pat. No. 3,775,170).

However, in a particularly preferred embodiment the layer of non-expanded porous PTFE is a sintered porous PTFE formed from PTFE particles, comprising granular-type PTFE particles, fused together such as to form a porous integral network of interconnected particles. The PTFE particles used to form the porous network are generally wholly or partially made-up of granular-type PTFE particles, though other types of PTFE particles may also be included. The nature of "granular-type" PTFE is discussed later.

By the term "sintered" (and "presintered") is meant that the PTFE under consideration has been heated to above its melting point, which is about 343° C. for pure unmodified PTFE. By the term "unsintered" is meant that the PTFE has not been heated to above its melting point.

DETAILED DESCRIPTION OF THE INVENTION

Figure 1:
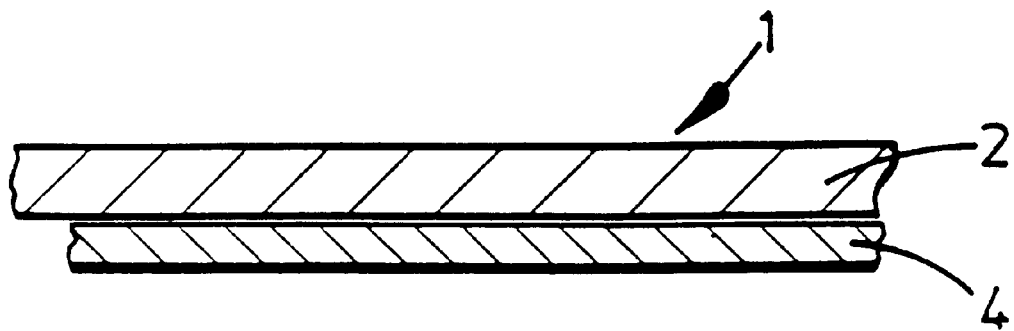
FIG. 1 is a cross-section to an enlarged scale of a porous composite material according to the present invention in the form of a web for use in a copying machine.

The porous composite material of, the present invention has an open porous structure which allows liquid to be received into the structure and retained therein, so that the material may act as a reservoir; and also allows liquid to be delivered at a controlled rate. The porous composite material has excellent mechanical properties, particularly at elevated temperatures such as 200° C. where other known materials may be subject to heat degradation. The porous composite material being formed substantially from polytetrafluoroethylene also exhibits excellent chemical resistance and can therefore be cleaned using acids, alkalis or oxidizing agents. The porous composite material also exhibits excellent dimensional stability and does not tend to shrink substantially at high temperatures, nor does the composite material tear easily. Being formed substantially of polytetrafluoroethylene, the porous composite material tends to have a non-abrasive outer surf ace, so that mechanical components in contact therewith exhibit low wear.

One principal application of the porous composite material of the present invention is in the field of filtration, particularly of gases and liquids. The good mechanical properties of the material are suited for liquid filtration applications, especially where the material is supported on a porous substrate such as a mesh material, particularly a stainless steel mesh.

Another principal application of the porous composite material of the present invention is in the copying field. According to the present invention, an oil transfer component for transferring oil (i.e. liquid release agent) to a roll in a fuser system of a copying machine is advantageously formed from the porous composite material. The present invention envisages such oil transfer components and also copying machines containing such oil transfer components. The oil transfer component formed of the porous composite material exhibits good retention capacities, so that for a given volume of material, large amounts of liquid release agent may be retained. The porous composite material also has an excellent ability to deliver liquid release agent at a controlled rate to a surface of the composite material, due to its capillary properties. This allows good control of the amount of liquid release agent which is applied to each sheet of copying medium (such as paper, cardboard, clear plastics etc.) which passes through the fuser system of the copying machine. The composite material also has good capillarity in directions parallel to the plane of the surface of the composite material, such that the liquid release agent is applied uniformly across the entire surface area of the sheet of copying medium.

Other applications of the porous composite material include medical applications, such as uses in blood or gas syringes and intravenous vents.

Where the oil-transfer component is to be used in the form of a web, it is important that the web exhibit good dimensional stability at the operating temperatures of the fuser system. These operating temperatures are typically in the region of 200° C. At such temperatures, many conventional sheet materials have a tendency to shrink or alternatively to stretch unduly. When put under an applied load, many conventional materials, will tend to elongate in the direction of the load and to become correspondingly narrower (i.e. neck-in) in the transverse direction. The porous composite material of the present invention has excellent dimensional stability at around 200° C. and is therefore particularly suitable for use in oil-transfer webs. Furthermore, the porous composite material of the present invention has good tear strength, such that it is difficult both to initiate and to propagate a tear within the material. Again, this enhances the properties of the material when used as an oil-transfer web.

Generally speaking, the porous composite material will be employed as an oil-transfer component by bringing the layer of non-expanded (usually sintered) porous PTFE into contact with the fuser system roll. This layer has particularly good oil delivery control properties. It also has excellent ability to remove excess toner from the roll and to retain the toner within the structure of the non-expanded porous PTFE. The ability of the oil transfer component to wipe excess toner from the fuser system roll is particularly enhanced when the roll contacting face of the porous composite material is textured. Such texturing may be effected by the use of a spray application technique as described hereafter.

The oil transfer component of the present invention is intended for holding and transferring liquid release agent to a roll in a fuser system, and also has the ability to remove excess release agent if necessary. Although the invention is primarily concerned with a porous composite material (and oil transfer component made therefrom) which comprises two layers, viz; an expanded PTFE membrane and a layer of non-expanded (e.g. sintered) porous PTFE, it is also possible to form the material as a multiplicity of layers, which, are formed of alternating layers of expanded PTFE membrane and non-expanded porous PTFE. Such multiple layer structures are particularly useful for building up thicker oil-transfer components, such as pads or rollers.

Generally speaking, the layers may be bonded together in any suitable manner known in the art, such as by the use of adhesives, by stitching etc. Where adhesives are used, the pattern of adhesive should preferably be a discontinuous pattern, such as a pattern of dots or lines, so as not to impede the flow of liquid release agent through the porous composite material. However, certain techniques of bonding the layers together, such as pressure bonding, are unsuitable, since the application of a pressure which is sufficient to lead to bonding may lead to crushing and distortion of the expanded PTFE membrane (leading to loss of oil retention capacity) Moreover, the use of an intervening adhesive or heat-bonding interlayer, constitutes a limitation on the properties of the overall porous composite material. Thus, parameters such as heat stability and chemical resistance may be limited by the properties of the adhesive or other material used to bond the two layers. This is disadvantageous, since the otherwise excellent properties of polytetrafluoroethylene are not attained in full.

It is a particularly surprising feature of the porous composite material of the present invention that in a particularly preferred embodiment the two layers may be integrally formed without the use of any intervening adhesive or other bonding material. In this way, a porous composite material is achieved which is formed entirely of polytetrafluoroethylene and which therefore has the overall properties of polytetrafluoroethylene without limitation by other components present. Such all-PTFE composite materials are highly advantageous for use at the high operating temperatures found in copying machines. According to the present invention, it is surprisingly found that a layer of sintered non-expanded porous PTFE may be formed in situ on the expanded PTFE membrane. It has been found possible to form the sintered porous PTFE layer directly on the expanded PTFE membrane by the application of a liquid suspension comprising granular-type PTFE particles, followed by baking at elevated temperatures so as to fuse together the granular-type PTFE particles and to form a porous integral network of interconnected particles. It has been found that the liquid dispersion can be arranged such as to wet the surface of the expanded PTFE membrane and to form a continuous liquid layer thereon without any discontinuities. It is also surprisingly found that when the granular-type PTFE layer is sintered at elevated temperatures, the layer of sintered porous PTFE becomes securely attached to the expanded PTFE membrane. This is a surprising observation, since it is normally difficult to heat-weld PTFE to PTFE by the simple application of high temperature. Bonding occurs at atmospheric pressure without the application of any elevated pressures which might otherwise lead to crushing of the expanded PTFE membrane. It is also surprising that the application of the layer of sintered porous PTFE by a liquid application technique does not appear to substantially effect the porosity of the expanded PTFE membrane. It must therefore be assumed that no interfacial barrier is created between the sintered porous PTFE layer and the expanded PTFE membrane, nor are the pores of the expanded PTFE membrane blocked by the application of the sintered porous PTFE layer.

Thus, the present invention advantageously allows the production of a porous composite material which is composed substantially entirely of polytetrafluoroethylene, whereby the maximal properties of polytetrafluoroethylene may be enjoyed. However, this does not preclude the inclusion of small amounts of modifiers as described herein.

If required, a layer of sintered porous PTFE formed from a liquid dispersion may be formed in situ between two expanded PTFE membranes, followed by baking at elevated temperature, so as to form a unitary multiple layer all-PTFE composite structure. Conversely, layers of sintered porous PTFE may be formed on either side of an expanded PTFE membrane (for example, by spraying and baking).

This fabrication technique is essentially brought about by the different methods of preparation of the expanded PTFE membrane and the preparation of the sintered porous PTFE layer. The former is generally produced by extrusion and stretching of a film; whereas the latter is produced from a coating of a liquid dispersion.

The thickness of the porous composite material is generally in the range 50 to 2000 microns, particularly 150 to 1000 microns. The expanded PTFE membrane may have a thickness of less than 50 microns (for example, down to 5 microns), but is-typically 50 to 500 microns, particularly 70-150 microns. The layer of non-expanded porous PTFE usually has a thickness up to and above 2000 microns, especially in the range 50-1500 microns, particularly 150-1000 microns.

The expanded PTFE membrane can be made using a number of processes, including the formation of an expanded network of polymeric nodes and fibrils in accordance with the teachings of U.S. Pat. Nos. 3,953,566, 3,962,153, 4,096,227 and 4,187,390. Generally, expanded PTFE membrane is made by blending a dispersion of so-called fine powder PTFE with hydrocarbon mineral spirits. The lubricated PTFE is compacted and ram extruded to form a tape. The tape can then be rolled down to a desired thickness and subsequently dried by passing the tape over heated drying drums. The dried tape can then be expanded both longitudinally and transversely at elevated temperatures. The expanded porous PTFE membrane generally has a pore size in the range 0.02 to 15 microns as measured by the bubble point method described herein. The choice of pore size may have an effect on the amount of release agent retained by the expanded PTFE membrane.

In one embodiment, the expanded PTFE membrane is formed into a fabric by twisting tapes of the membrane and weaving these into a fabric (such a material is available from W.L. Gore & Associates, Inc. under the RASTEX trademark). This fabric may be laminated (e.g. by heat bonding) to an expanded PTFE membrane to give improved mechanical properties. Alternatively, the layer of non-expanded porous PTFE may applied onto the fabric alone.

The amount of liquid release agent retained by the expanded PTFE membrane is also determined by the porosity of the membrane. A high porosity material is able to hold large quantities of liquid release agent. However, the delivery rate of such release agent from the expanded porous PTFE tends to be at an undesirably high rate. For this reason, it is preferred to arrange for the expanded PTFE membrane to act as a reservoir for the release agent, and for the actual delivery of release agent to be controlled by the layer of non-expanded porous PTFE, which is generally arranged to be adjacent to the roll of the fuser system of the copying machine. Thus, the porous composite material has properties of both reservoir material and a release agent delivery control material.

The non-expanded porous PTFE layer may be a sintered material produced as described in patent specification GB2242431. The material is formed from one or more grades of granular-type polytetrafluoroethylene. As is well known, PTFE is produced in two distinct types which are so called "granular" PTFE and so called "fine powder" PTFE. Fine powder PTFE is employed to produce the expanded PTFE membrane discussed above. On the other hand, the sintered non-expanded porous PTFE layer is produced from granular-type PTFE. These materials have quite different properties.

By the term "fine powder type PTFE" is meant that type of PTFE produced by the emulsion polymerization technique. This technique produces a resin that cannot be ram extruded but which must be extruded by the paste extrusion method where the resin must first be mixed with a lubricant. The term "fine powder" is a term of art in the PTFE field and refers to the type of PTFE. It has no relationship to particle size.

Both the term "granular type" and "fine powder type" PTFE include herein homopolymer tetrafluoroethylene and modified PTFE, so-called because the homopolymer is modified by copolymerization with a copolymerizable ethylenically unsaturated comonomer in a small amount of less than 2% by weight of copolymer. These copolymers are called "modified" because they do not change the basic character of homopolymer PTFE, and the copolymer remains non-melt processable just as the homopolymer. Examples of comonomers include olefins such as ethylene and propylene; halogenated olefins such as hexafluoropropylene (HFP), vinylidene fluoride and chlorofluoroethylene; or perfluoroalkyl vinyl ethers such as perfluoropropyl vinyl ether (PPVE).

The sintered non-expanded porous PTFE may be produced from a dispersion of granular-type PTFE particles in a liquid. The granular-type PTFE used in this preparation may be unsintered or may have been pre-sintered. The sintering process modifies the characteristics of the granular-type PTFE material. One particular embodiment of the present invention employs unsintered PTFE material; however mixtures of sintered and unsintered material may also be used in other embodiments. Teflon granular-type resin grades 7A (unsintered) and 9B (sintered) are available from DuPont Speciality Polymers Division, Wilmington, USA. Generally speaking, the sintered non-expanded porous PTFE may be produced from 0–100% unsintered PTFE (e.g. grade 7A) and conversely 100–0% sintered PTFE (e.g. grade 9B). where the sintered porous PTFE is formed from a mixture of sintered and unsintered S granular-type PTFE particles, it is preferred that the unsintered PTFE predominate since this leads to a material having good-control of oil delivery and good strength. The inclusion of sintered PTFE particles tends to increase the porosity of the sintered porous PTFE layer produced.

The granular-type PTFE particles may have a particle size in the "range 1 to 600 microns, especially 5 to 500 microns, particularly 10 to 300 microns.

The unsintered granular-type PTFE will ordinarily have a particle size of between 1 and 300 microns, particularly 20 and 150 micron (mean size of about 35 micron). One commercial grade unsintered granular-type resin is available from the DuPont company as Teflon 7A as mentioned above. Another grade, having elongated fibrous particles, is available from DuPont with the trade name Teflon 7C. The granular-type resin or resins (whether unsintered or sintered) may also be modified by the inclusion of a small amount of a comonomer (such as hexafluoropropylene or perfluoropropyl vinyl ether) typically in an amount up to 1% or up to 2% by weight. An unsintered modified PTFE is Teflon 70J available from Mitsui Fluorochemical. It is modified PTFE in which the comonomer is perfluoropropyl vinyl ether (PPVE). It can be presintered before use.

Unsintered granular PTFE tends to be made of soft particles which can "pack" together to form a fairly strong web when sintered having small pore sizes. For example, Teflon 7A has a tensile strength of 471.4 N/cm$^2$ and a mean pore size of 2.01 micron, when fused into a network.

On the other hand, sintered granular PTFE is composed of hard, substantially noncompactable particles. When baked above the melt temperature, only weak inter-particle connection is obtained and leads to large pore sizes. For example, sintered granular-type PTFE is available from the DuPont company under the trade name Teflon 9B. It has a specific strength of 79N/cm$^2$ and a mean pore size of 6.04 micron when ground particles of 40 micron size are fused into a network.

The granular-type PTFE particles (whether sintered or unsintered particles, or a mixture of both) used to produce the sintered non-expanded porous PTFE may have admixed therewith materials selected from the class consisting of (i) unsintered fine powder PTFE (which may itself be modified or unmodified), (ii) particles of a thermoplastic fluorinated organic polymer, (iii) particles of a low molecular weight PTFE micropowder produced by irradiation, and (iv) mixtures thereof;

present in an amount of between 1 and 20% by weight of solids.

Unsintered fine powder PTFE is available from a number of sources, e.g. The DuPont Company, ICI or Daikin, and may be used either in particle form or in the form of a liquid dispersion thereof. A modified fine powder PTFE containing hexafluoropropylene comonomer is available from ICI (primary particle size 0.2 to 0.4 microns) a s CD509 and modified PTFE containing perfluoropropyl vinyl ether is also available. Such modified resins generally contain up to 1% or up to 2% by weight of the modifier.

Examples of the thermoplastic fluorinated organic polymers include copolymers of tetrafluoroethylene and hexafluoropropylene (commonly called fluorinated ethylene-propylene copolymer or FEP), and of tetrafluoroethylene and perfluoroalkyl vinyl ether (when the ether is perfluoropropyl vinyl ether the copolymer is commonly called PFA).

Micropowders produced by irradiation are available from DuPont.

Particles of an organic or inorganic filler material may also be included. Examples of fillers include carbon, activated carbon, glass, chromium oxide,, titanium oxide, chopped expanded PTFE, silica dioxide, and the like. In other words, virtually any filler can be employed to add specific properties to the composition. The amount of filler can be as high as 60% or more based on weight of composition.

Where the sintered non-expanded porous PTFE is formed of a mixture of sintered granular-type particles, together with a "softer" material such as unsintered granular-type PTFE or any of the materials (i) to (iv) above, it is believed that the softer materials form moieties which link the harder sintered particles to provide increased inter-particle connection strengths. Non-expanded PTFE formed solely of hard sintered granular-type PTFE particles tends to have relatively poor strength, and poor adhesion to the expanded PTFE membrane. Adhesion to the expanded PTFE membrane is increased by increasing the proportion of unsintered granular resin, by including a modifier in the granular resin, or by including any of the softer materials.

The porous PTFE structure of the porous composite membrane is hydrophobic but has a high affinity for liquid release agents (referred to herein also as "release Oils") such as silicone oil. The oil transfer component formed of the porous composite material will generally be supplied pre-loaded with release oil. In an oil-filled type of oil transfer component, the component is discarded when this oil is substantially used up or the oil flow reduces to an unacceptable level. In an oil-fed type of oil transfer component, further oil is supplied to the oil transfer component by means of an oil delivery mechanism. Typically, the oil will constitute 10% to 70% by wt. of the total weight of the porous composite material, particularly 20% to 60% by wt. In order to provide such oil retention capacities, the overall density of the porous composite material is generally in the range 0.5 to 1.2, typically 0.7 to 1.0 $g/cm^3$ measured as described herein. In comparison, pure non-porous solid PTFE typically has a density of 2.16 $g/cm^3$. Generally, the expanded PTFE membrane will have a porosity in the region 50–98%, generally 70–95%. The density of the sintered porous PTFE layer measured as described herein is usually in the range 0.5 to 1.8, for example 0.6 to 1.5, typically 0.7 to 1.2 $g/cm^3$ (corresponding to porosities of 77 to 16%, 72 to 30% and 68 to 44% respectively).

In fact, the properties of the expanded PTFE membrane and the sintered porous PTFE layer differ markedly as regards porosity and pore size. Generally speaking, the expanded PTFE has a relatively high porosity and smaller pore size; whereas the sintered porous PTFE has a relatively low porosity and a larger pore size. Typical values of materials for use in the present invention are as follows.

|  | Porosity | pore size (microns) | Bubble point (pounds/in 2) |
|---|---|---|---|
| expanded PTFE | 50–98% | 0.02–10* | 40–0.4 |
| sintered porous PTFE | 30–80% (e.g. 30–70%) | 0.5–20** (e.g. 2–6) | 5–0.1 (e.g. 1–0.6) |

*maximum pore size as determined by Bubble Point method D1.
**mean pore size as determined by Coulter Porometer method D2.

A further aspect of the present invention provides a method of forming the porous composite material which comprises providing an expanded PTFE membrane; and forming thereon a layer of sintered non-expanded porous PTFE attached to the expanded PTFE membrane, the sintered porous PTFE being formed from particles of granular-type PTFE fused together such as to form a porous integral network of interconnected particles.

As mentioned above, the layer of sintered porous PTFE is generally formed by coating the expanded PTFE membrane with a liquid dispersion comprising particles of granular-type PTFE and baking at an elevated temperature such as to form a porous integral network. The liquid dispersion can be applied by any suitable liquid coating technique, such as roller coating or by using a doctor blade, so as to apply a continuous coating of uniform depth over the expanded PTFE membrane. However, in a preferred embodiment, the liquid PTFE dispersion is applied onto the expanded PTFE membrane by spraying.

The dispersion will contain suitable surfactants and thickening agents to enable it to wet and continuously coat the expanded PTFE membrane. If desired, a stabilized aqueous dispersion of the (i) fine powder or the (ii) thermoplastic fluorinated organic polymer can be mixed with the granular-type PTFE mixture in an aqueous liquid (e.g. of water and alcohol, for example isopropanol) and the ingredients can be co-coagulated. This results in the much smaller sized fine-powder resin polymer or the thermoplastic polymer particles congregating about the surface of the much larger size granular-type particles. This coagulated product can then be dispersed in water for spray coating or dip coating.

The liquid coating is then dried and baked at elevated temperature. Usually, a preliminary step involves heating slowly to 100° C. in order to dry off water and any other volatiles, and holding at that temperature for a short period of time. Thereafter, the temperature is raised progressively up to 330 to 3850 C (e.g. 340 to 370° C.) in order to allow sintering and fusion of the PTFE particles to occur.

At these high temperatures, the expanded PTFE membrane is not dimensionally stable and tends to stretch if held under an applied load, or to shrink if there is no load. Therefore, the expanded PTFE membrane is generally held in a frame, or stenter (for a continuous process) so as to prevent shrinkage or elongation during the production of the sintered porous PTFE layer.

FIG. 1 shows the porous composite material I of the present invention to an enlarged scale. The porous composite material comprises at least two layers 2 and 4. Layer 4 is composed of an expanded polytetrafluoroethylene (PTFE) membrane, a material which is available in a variety of forms from W.L. Gore & Associates Inc. of Elkton, Md., USA, under the trademark Gore-Tex. The expanded PTFE membrane is typically produced by blending a PTFE fine particle dispersion with hydrocarbon mineral spirits, followed by compaction and ram extrusion through a die to form a tape. The tape may then be rolled down to a desired thickness and dried by passing over heated drying drums. The dried tape can then be expanded both longitudinally and transversely at elevated temperatures at a high rate of expansion, so as to form a porous expanded PTFE membrane.

In an alternative embodiment, the layer 4 is composed of expanded PTFE membrane in the form of twisted tape, which has been woven into a fabric. One such fabric is available under the Rastex trademark from W.L. Gore & Associates Inc. K The second layer 2 of PTFE material is formed of a sintered PTFE material made in a different way. The sintered material is produced by forming a liquid suspension comprising granular-type PTFE particles. The granular-type PTFE particles may be pre-sintered, unsintered or partially sintered, or may be a mixture of these various forms of granular-type PTFE. The suspension is then sprayed in one or more layers onto a substrate until the desired thickness is achieved. The sprayed material is dried in an oven by taking the material through a predetermined drying and baking regime up to elevated temperatures (e.g. 350–385° C.), as described in more detail later. This leads to the production of a porous sintered structure wherein the particles of granular-type PTFE become fused together to form a porous integral network of interconnected particles. This material is characterized by a particularly large pore size in relation to the expanded PTFE membrane (for a given porosity). Generally, the sintered porous PTFE material is produced in greater thicknesses than the expanded PTFE. The sintered porous PTFE has excellent dimensional stability.

The porous composite material is advantageously formed by spraying (or otherwise applying, such as by means of a doctor blade) the liquid PTFE particle suspension directly onto the expanded PTFE membrane which thereby acts as the substrate. Generally the bond strength between surfaces of PTFE materials is poor without the use of surface treatments and/or adhesives, but it has been found surprisingly that not only is it possible to apply the aqueous liquid suspension directly onto the expanded PTFE membrane, but that after baking, a good bond is formed between the two layers. This not only provides a convenient fabrication technique, but also produces a porous composite material which is composed entirely of PTFE and therefore is a material whose overall properties are not limited by the presence of any other agent of inferior properties.

However, expanded PTFE membrane tends to shrink (or to stretch if under tensile load) at the elevated temperatures required f or baking the sintered porous PTFE material. For -this reason it is necessary to hold the expanded PTFE membrane in such a way as to maintain its original dimensions during the baking process. one way of approaching this is to hold the expanded PTFE membrane in a frame (where single pieces of material are to be produced) or by means of a stenter in the case of a continuous production facility.

Another benefit of forming the sintered porous PTFE layer directly on the expanded PTFE membrane, is that restrictions on the properties of the sintered porous PTFE material which may arise from skinning of the outer surface thereof are mitigated, since there is effectively no free surface at the interface between the membrane and the sintered porous PTFE layer. The ability of liquids or gases to flow across the interface between the expanded PTFE membrane and the sintered porous PTFE layer is good. This factor is significant in the case of the transfer of liquid release agent through the thickness of the porous composite material in the case of copying machine applications. It is also significant in the bulk transfer of liquid through the porous composite material in the case of liquid or gas filtration applications.

However, in an alternative fabrication method, it is possible to preform the expanded PTFE membrane and the layer of sintered porous PTFE in separate fabrication steps, and thereafter to laminate the one to the other by conventional lamination technology. Such lamination technology includes the use of continuous or discontinuous intermediate adhesive layers using a variety of adhesives known for the purpose. In the case of an adhesive which is impermeable to liquid, the adhesive layer would normally be in the form of a discontinuous pattern, such as a pattern of dots or lines. A disadvantage of the use of adhesives is that generally speaking their properties, such as high temperature resistance and chemical resistance are generally inferior to those of either the expanded PTFE membrane or the sintered PTFE layer, so that the overall properties of the porous composite material are correspondingly degraded.

Figures 9, 10:
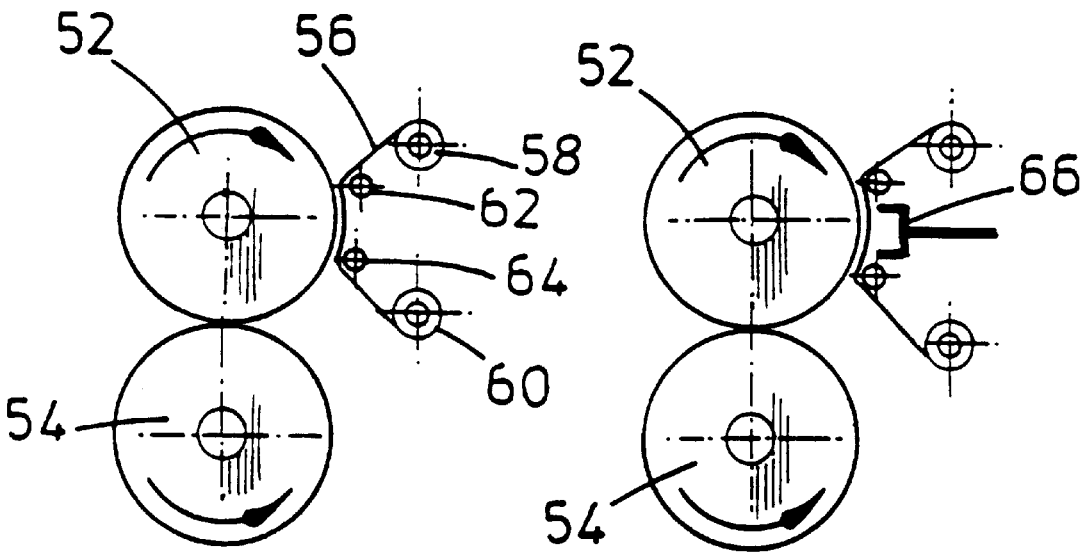
FIG. 9 is a schematic cross section through the fuser system of a copying machine wherein liquid release agent is applied by means of a continuous web which is advanced incrementally from a feed spool to a take-up spool.
FIG. 10 is a schematic view similar to FIG. 9 wherein liquid release agent is additionally fed to a reverse side of the web of porous composite material.

The porous composite material shown in FIG. 1 has a variety of applications. A principal application is for use in metering of liquid release agent to a roll within the fuser system of a copying machine, which arises in view of the good liquid retention and delivery characteristics of the composite material. In the form of a web, the porous composite material may be attached at either end to a spool to allow the web to be advanced slowly (either incrementally or continuously) past a roll in the fuser system. Typical arrangements are shown in FIGS. 9 and 10 as will be discussed hereafter. The porous composite material may be arranged such that the layer of sintered porous PTFE is directly adjacent the roll in the fuser system, since this material has good oil delivery properties. The sintered PTFE material also has good properties as regards the pick up of waste toner from the roll and good retention of the picked up toner. On the other hand, the expanded PTFE membrane has very good oil retention capacity and is therefore preferably used as a reservoir material behind the sintered porous PTFE layer.

However, in certain applications, it may be preferred to arrange that the expanded porous PTFE membrane layer of the porous composite material is adjacent to the roll of the fuser system. This might be the case where there is no requirement that the porous composite material pick up the waste toner (this being dealt with by some other means within the copying machine). Here the excellent low friction properties of the expanded porous PTFE membrane may be utilized to minimize wear on the roll.

The porous composite material of the present invention may be used in a number of formats within conventional copying machines where its advantageous properties of excellent dimensional stability, high strength, good release agent retention capacity and good delivery rate at high temperatures may be utilized.

Figure 2:
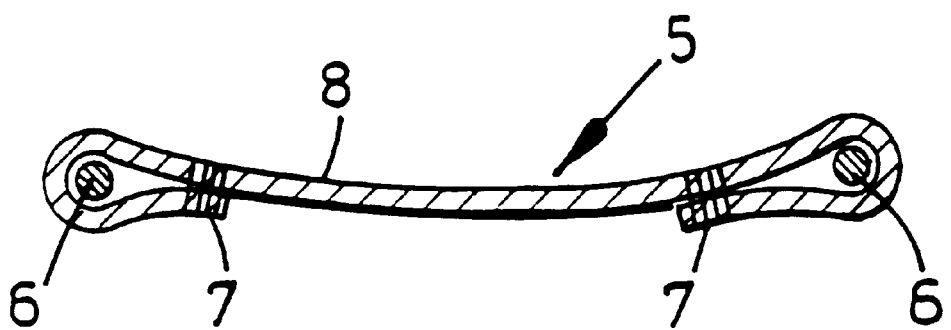
FIG. 2 is a cross-sectional view of the porous composite material of the present invention in the form of a cover wick for mounting in a copying machine.

FIG. 2 shows in cross-section a so-called "cover wick" for use in a photocopying machine. The cover wick 5 comprises a sheet of the porous composite material which has been folded over and hemmed along each edge. Within each hem a mounting rod 6 is retained by folding over the material and stitching a seam 7 along each edge. The upper surface 8 of the cover wick is arranged to contact the roll of the fuser system and generally speaking this will be the sintered porous PTFE layer of the porous composite material of the present invention, so as to provide good toner pick up and holding, and oil delivery characteristics. As will be described in more detail in relation to FIG. 11, the cover wick may be employed in conjunction with a reservoir material containing liquid release agent and located behind the cover wick.

Figure 3:
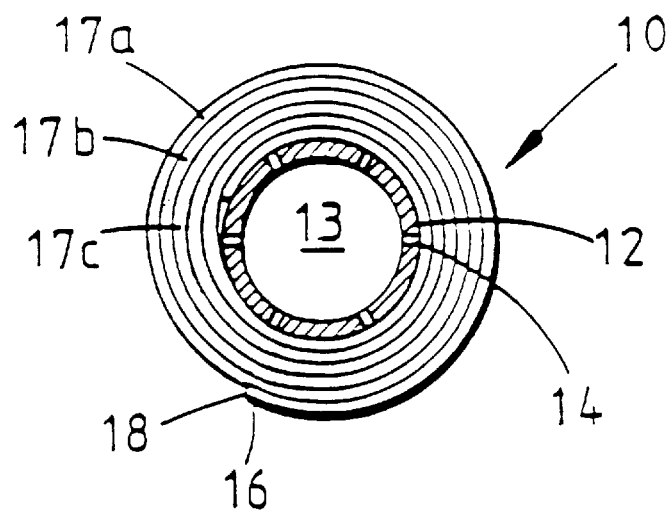
FIG. 3 is a cross-section through a roller for use in a copying machine, and which comprises a spiral wrap of the porous composite material of the present invention mounted on a core.

FIG. 3 shows in cross-section an oil transfer component in the form of a roller 10. The roller comprises a hollow cylindrical core 12 equipped with suitable bearings (not shown) for mounting in a copying machine. The core 12 has a hollow interior 13 for containing a liquid release agent such as release oil, which is delivered therefrom via apertures 14 provided in the core. Alternatively, the core could be formed of a sintered ceramic material. A single length 16 of the porous composite material is wound around the outside of the core so as to form six contiguous layers (17a, 17b, 17c etc.). After winding, an adhesive or potting material e.g. a silicone adhesive such as silicone sealant RTV732 (Dow Corning) is applied to the longitudinal ends of the wound layers so that the contiguous layers become adhered together at the ends of the cylindrical roller. The free end 18 of the length of sheet material may either be adhered to the underlying layer if necessary, or may be left free.

The length of porous composite material has a width sufficient to cover the desired area on the roller. That is to say the width of the porous composite material provides a full width of the oil transfer component. However, the length of composite material may in an alternative embodiment be spirally wound in a series of overlapping turns onto the roller core so as to build up the desired width and thickness.

Figure 4:
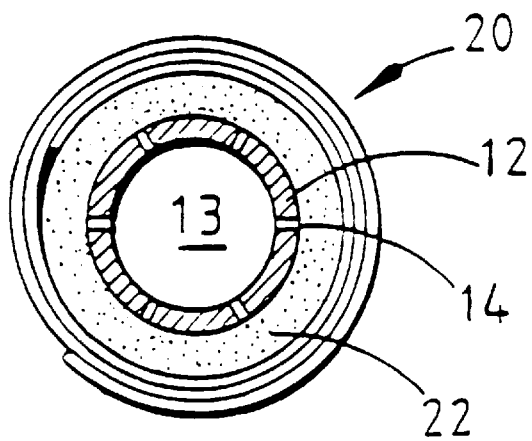
FIG. 4 is a cross-section through a roller for use in a copying machine and comprising a spiral wrap of the porous composite material of the present invention wrapped over a hollow sleeve of reservoir material, which is in turn mounted on a central core.

FIG. 4 is a cross-section of a roller 20 having a core 12 as before. This differs from the embodiment shown in FIG. 3 in that a hollow sleeve 22 of suitable reservoir material, such as a felt formed of Nomex fibres or an open-cell foam plastics material is employed. The fibres sold under the Nomex trademark are aramid fibres, a type of polyamide. The open-cell foam might be an open-cell polyurethane or melamine foam.

Around the outside of the reservoir 22 is wound one or more turns of a single length of the composite material 16. The edges of the composite material are bonded as before. once again, either the expanded PTFE membrane layer or the sintered porous PTFE layer may be arranged to be outermost on the roller surface which contacts the roll of the fuser system of the copying machine.

Figure 5:
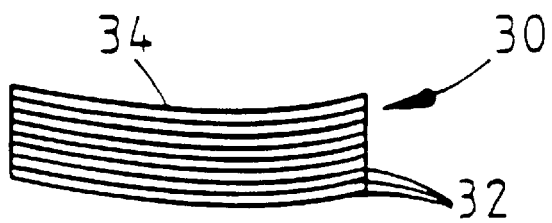
FIG. 5 is a cross-section through a pad for use in a copying machine wherein the pad is formed of multiple layers of the porous composite material.

FIG. 5 is a cross-section through a pad 30 formed of a plurality of contiguous layers 32 of the porous composite material. The layers are bonded together by means of a pattern of adhesive dots between adjacent layers. The roll contacting face 34 of the oil transfer pad 30 is slightly curved so as to follow the curvature of the roll in the fuser system onto which the pad transfers release oil in use.

Figure 6:
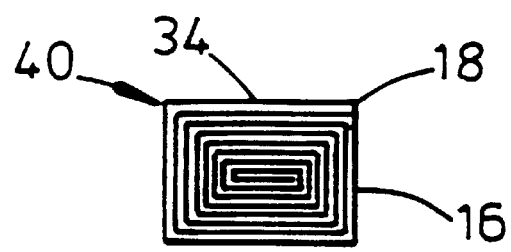
FIG. 6 is a cross-section through a pad of rectangular cross section formed by wrapping a single length of the porous composite material of the present invention.

FIG. 6 also shows an oil transfer component in the form of a pad having a roll-contacting face 34. In this case, the pad has a substantially rectangular cross-section and has been formed by winding a single length of sheet material 16 in a substantially rectangular manner. Although not shown, it may be convenient to wind the length of sheet material about a flat central former, which former may be left in place or may be withdrawn after production of the oil transfer pad.

Figure 7:
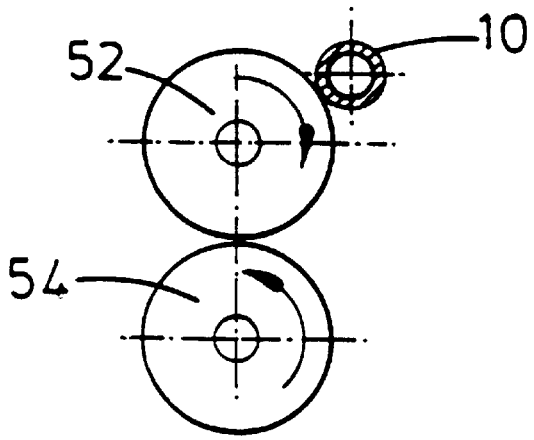
FIG. 7 is a schematic drawing of a fuser system of a copying machine employing a roller to apply liquid release agent.
Figure 8:
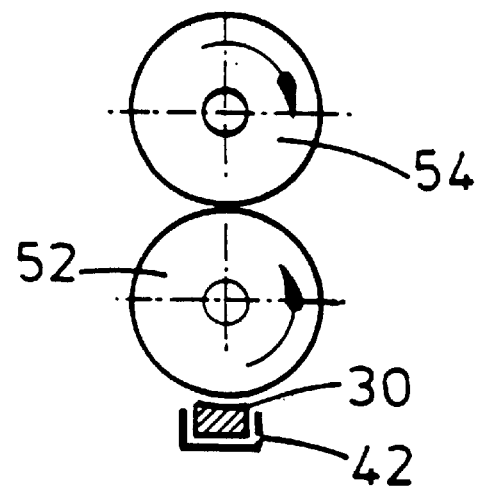
FIG. 8 is a schematic view of a fuser system of a copying machine wherein a pad is used to apply liquid release agent.

FIGS. 7 and 8 show fuser systems employing oil transfer components comprising the porous composite material of the present invention. The fuser system in one conventional format comprises a PTFE-covered (or silicone rubber covered) fuser roll 52 and a silicone rubber covered pressure roll 54, which are oiled and wiped by means of a given oil transfer component. In the case of the FIG. 7 embodiment, release oil is applied to the fuser roll 52 by means of oil transfer roller 19. In the case of FIG. 8, release oil is applied to the fuser roller 2 by means of a pad 30 (such as that shown in FIG. 5 or 6) held within a channel 42. However, in either case the release oil may be applied to the pressure roll 54 instead of to the fuser roll 52, if desired. Also, the oil transfer components may either be provided as oil-filled components, that is to say they contain a predetermined quantity of oil and are discarded after the release oil is used up; or may be provided as an oil-fed type in which case a supply of release oil is constantly fed to the oil transfer component (which is usually supplied pre-loaded with release oil) by a conventional oil delivery means.

FIGS. 9 and 10 show the use of continuous webs of the porous composite material of the present invention acting as oil-filled and oil-fed oil delivery systems respectively. In FIG. 9, a continuous web 56 formed of the porous composite material is attached at one end to a feed spool 58 and at the other end to a take-up spool 60. The web may be attached by conventional means, such as by the use of an adhesive or by the use of adhesive tape. Prior to use, the web is rolled onto the delivery spool .58 and supplied in this manner. The web assembly so formed is fitted into the photocopying machine so that a free loop of web runs over the pressure rollers 62, 64. Usually, the porous composite material is arranged such that the layer of sintered porous PTFE runs in contact with the-fuser roll 52. In use, the web of porous composite material is advanced either continuously or incrementally at a predetermined rate from the delivery spool to the take up spool. The rate is determined by the oil capacity of the web and the oil delivery rate, and also by the capacity of the porous composite material to pick up and hold waste toner cleaned from the fuser roll. The arrangement shown in FIG. 10 is similar except that a conventional oil delivery means 66 is provided behind the web so as to feed release oil to the web (usually by feeding release oil to the expanded PTFE membrane layer of the composite material which has good oil retention capabilities.

Figure 11:
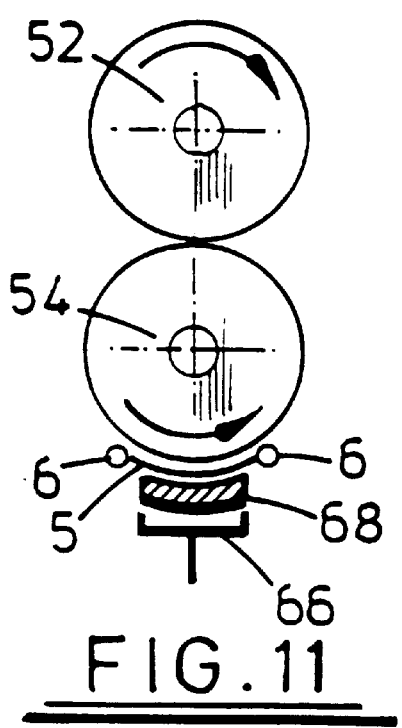
FIG. 11 is a schematic view of the fuser system of a copying machine wherein liquid release agent is applied by a cover wick formed of the porous composite material of the present invention.

FIG. 11 shows a fuser roll/pressure roll arrangement as described above but in this case oiling and wiping is carried out by means of an assembly comprising a cover wick of the type shown in FIG. 2, in conjunction with a reservoir pad 68. The reservoir pad may be formed of conventional reservoir materials, such as aramid felts, polyurethane foams or melamine foams. An oil delivery device 66 is provided to feed liquid release oil into the reservoir pads 68 and from there to supply oil to the cover wick 5.

The invention will now be further described in relation to certain examples as follows.

EXAMPLE-1
(Production of Porous composite Material)

A suspension of granular-type PTFE in an aqueous medium suitable for spray application was made up in the following manner. The following proportions of liquid formulations were blended together in a Waring blender for 30 seconds:

41.8% water
41.8% of a 1% carboxymothyl cellulose solution
7.5% Pluoronic L121 surfactant
6.0% Zonyl FSN-100 surfactant solution and
2.9% Triethanolamine.

The carboxymethyl cellulose solution was prepared by dissolving 1% carboxymethyl cellulose (which acts as a thickening agent) in water as a 1% wttwt solution. Pluoronic L121 (trademark) surfactant is a polyoxyethylenepolyoxypropylene block copolymer. Zonyl (trademark) FSN-100surfactant is a non-ionic perfluoroalkyl ethoxylate mixture. The surfactant solution used to make up the above suspension was comprised of a mixture of four parts FSN-100, three parts water and three parts isopropanol, the parts being by weight. To this solution was added sufficient DuPont (trademark) granular-type PTFE grade 7A particulate solids to give an overall solids content of 55-% wt/wt. The granular-type PTFE was added to the liquid whilst the blender was still in operation. Blending was then continued for a further 2 minutes in order to provide an aqueous suspension suitable for spray application.

The properties of the sprayed material (such as density and oil retention capacity) could be modified by varying the type of granular PTFE employed. PTFE grade 7A is unsintered. There exists a granular-type PTFE grade 9B which is a pre-melted sintered resin. This may be milled as described herein prior to use. The solids content of the suspension could be varied in the range 0–100% grade 7A and 0–100% grade 9B depending on the desired properties of the final sintered porous PTFE layer. Use of high proportions of grade 7A leads to a relatively strong sintered material of relatively low oil retention and low capillarity. High proportions of grade 9B favor the production of a more porous sintered material having high oil retention capacity and high capillarity, and this more open structure tends to have good toner wiping properties.

A porous composite material according to the present invention was then produced in the following manner. An expanded PTFE membrane obtained from W.L. Gore & Associates Inc. of nominal pore size 0.2 microns (as determined herein) and 78% porosity (according to the manufacturer's product sheet) was stretched over a grit blasted mild steel plate and wrapped over the edges of the plate such that the membrane was held in tension. The granular-type PTFE suspension prepared in the manner described above was then sprayed onto the expanded PTFE membrane using a Binks Model 62 spray gun and employing air and fluid pressures set to give good atomization of the suspension. The liquid suspension was observed to wet and evenly coat the expanded PTFE membrane. The spray coated plate was then subjected to a drying and baking regime in an oven as follows. Firstly, the oven was heated progressively to 100° C. and the temperature held for 2 hours. Then the temperature was progressively raised to 280° C. and held at that temperature for 0.5 hours. Finally, the temperature was raised progressively to 350° C. and held for 2 hours at that temperature to complete the baking process. The resulting structure was then allowed to cool.

The porous composite material produced in this manner was then removed from the mild steel plate and its properties determined. The thickness of the porous composite material comprising the layer of sintered porous PTFE on the expanded PTFE membrane was measured using a dial gauge according to ASTM D461 to be 320 microns. The thickness of the expanded PTFE membrane before application of the spray coating was approximately 80 microns. By subtraction, the thickness of the layer of sintered porous PTFE attached to the expanded PTFE membrane was 240 microns. The layer of sintered porous PTFE was found to be securely attached to the underlying expanded PTFE membrane. The sintered porous PTFE had a porosity of about 45% and a pore size of about 2 microns.

Air Flow Characteristics

The porosity of the composite material to airflow was then determined and compared to the porosity of the original expanded PTFE membrane. The porosity is relevant to filtration applications, particularly gas or liquid filtration. The airflow rate was determined through the porous composite material produced from a 0.2 micron expanded PTFE membrane as described above, and compared with the airflow rate through the expanded PTFE membrane itself as a comparison. The Gurley test measures the number of seconds required for 100 cc of air to pass through one square inch of the material under a pressure drop of 4.88 inches of water. The results are as follows:

Expanded PTFE membrane (comparison)—20–28 secs
Porous composite material (invention)—20–28 secs
(a comparable sintered porous PTFE sheet had a Gurley number of about 3 secs).

Thus, it can be seen that the application of the layer of sintered porous PTFE to the expanded PTFE membrane in the manner described above has substantially no effect on the airflow rate through the material. The composite material of the present invention is porous and the airflow porosity is principally determined by the limiting porosity of the expanded PTFE membrane. This reflects the fact that the sintered porous PTFE material has relatively large pores in comparison to the expanded PTFE material.

EXAMPLE 2

(Production of porous composite material)

The preparation procedure for producing the porous composite material of Example 1 was repeated, but this time employing an expanded PTFE membrane of nominal pore size 0.45 microns and 84% porosity.

After baking and cooling, the porous composite material of the invention as removed from the steel plate and its properties measured. The thickness of the composite was found to be 0.2 mm. The thickness of the expanded PTFE membrane initially was 0.08 mm; so that by subtraction the layer of sintered porous PTFE was 0.12 mm thick.

Oil Retention & Delivery Characteristics

The oil capillarity of the composite was compared with the capillarities of individual sheets of expanded PTFE membrane and of sintered porous PTFE in the manner described herein. The oil capillarity measures the capacity of the material to draw oil through by capillary action and is thus a measurement of the ability of the material to deliver liquid release oil to the roll of the fuser system of a copying machine.

The oil retention capacities were also measured and these relate to the reservoir capacity of the material to hold liquid release oil. In the case of an oil filled oil-transfer component, such as a web or roller, the capacity to retain oil is an important factor in determining the amount of oil which may be delivered from a unit volume of material. Where the material has a high oil retention capacity, this is advantageous in that the oil transfer component formed thereof has a potentially longer lifetime before the amount of oil delivered per page falls below acceptable limits.

These properties were determined as follows:

| Material | Thickness (mm) | Oil Capillarity (mm) | Oil Retention (cc\cc) |
| --- | --- | --- | --- |
| Expanded PTFE (0–45 microns) | 0.08 | 13 | 1.08 |
| Sintered porous PTFE | 0.13 | 18 | 0.44 |
| Composite (invention) | 0.20 | 15 | 0.51 |

The properties of the sintered porous PTFE sheet were determined f or a sintered PTFE sheet produced separately by spraying suspension onto a plain stainless steel sheet and baking, so as to produce a sheet of thickness 0. 13, roughly equivalent to the thickness of the sintered porous PTFE layer in the porous composite material of the present invention, in order to provide a valid comparison.

EXAMPLE 3

(Composite of 7A and an expanded membrane)

The following proportions (% volume) of liquid formulations were blended together for 2 minutes using a Silverson mixing head:

20.9% Carboxymethyl cellulose solution
62.9% Water
7.2% Zonyl FSN-100 surfactant solution
9.0% Pluronic L121 surfactant This mixture is known as the "surfactant concentrate". The carboxymethyl cellulose solution was prepared by dissolving carboxymethyl cellulose (which acts as a thickening agent) in water at a 1% (by weight) concentration. Pluronic (trademark) L121 surfactant is a polyoxyethylene/polyoxypropylene block copolymer. The Zonyl FSN-100

(trademark) surfactant is a non-ionic perfluoroalkyl ethoxylate mixture. The Zonyl FSN-100 surfactant solution consisted of a mixture of four parts Zonyl (FSN-1 00, three parts water and three parts isopropyl alcohol (by weight).

15 kgs of DuPont granular PTFE resin grade 7A with an average particle size of 35 microns and 27 litres of "surfactant concentrate" are blended together for 3 minutes using a Silverson mixing head, to form a suspension. The resulting aqueous suspension was suitable for spray application.

An expanded PTFE membrane obtained from W.L. Gore & Associates, Inc. having an all-fibril morphology with an approximate thickness of 5 microns was held under tension between two annular aluminum plates (12 inch outside diameter, 8' inch inside diameter). The plates are tightly held together with 8 locking bolts. The tensioned membrane contained within the internal diameter of the plates is not in contact with any other surface.

The aqueous suspension was sprayed onto one side of the membrane using a Binks BBR spray gun. The spray coated membrane held between the aluminum plates was dried in an oven at 80° C. for 30 minutes. The temperature was then increased over several hours to 350° C. and held at this temperature for 10 minutes to complete the baking process. After cooling, the aluminum plates are unbolted and the porous composite material removed. The thickness of the composite was measured at 170 microns and therefore by subtraction, the layer of sintered porous PTFE on the expanded membrane was 165 microns. The air flow rate and maximum pore size of the composite was determined and compared to the separate composite materials. The air flow rate is measured using a Gurley 4110 Densometer (see previous example for test definition). The maximum pore size is determined using a COULTER POROMETER II and the method (D2) is outlined in the Testing Methodologies section. The results are as follows:

| SAMPLE | THICKNESS (microns) | GURLEY (s/100 cm3) | MAXIMUM Pore Size (microns) |
|---|---|---|---|
| Expanded Membrane | 5 | 1.4–1.7 | 0.30 |
| 7A: Membrane Composite | 170 | 5.5–5.9 | 0.44 |
| 7A Porous Sheet | 225 | 15.9–6.0 | 6.58 |

The density of the 7A porous sheet was 1.24 g/ CM3.

Due to the thickness and morphology effects, the air flow rate of the membrane is relatively high. However, the composite material in this Example has a lower air flow rate (higher Gurley value) due to the fact that the sintered porous 7A PTFE layer contributes a lower air flow rate. In contrast, the maximum pore size of the composite is essentially determined by the composite layer which has the smallest maximum pore size diameter (see pore size test method (D2)). Hence the similarity in the pore size values of the composite and expanded membrane structures.

Scanning electron micrographs show surface morphologies of the composite are characteristic of the respective expanded membrane and granular PTFE materials i.e. no incorporation of the separate composite phases was noted.

EXAMPLE 4
(Composite of 50%7A:50%9B and Expanded Membrane)

500 g of Du Pont granular PTFE resin grade 7A with an average particle size of 35 microns, 80- of Zonyl FSN-100 surfactant solution and 1.3 kgs of water are blended together for 60 seconds using a Waring blender to form a suspension. 500 g of Du Pont granular PTFE resin grade 9B which has previously been milled to an average particle size of 55 microns was added to the suspension and reblended for a further 60 seconds. The resulting aqueous suspension was suitable for spray application. The Zonyl FSN-100 surfactant is a non-ionic perfluoroalkyl ethoxylate mixture. The Zonyl FSN-100 surfactant solution consisted of a mixture of four parts Zonyl FSN-100, three parts water and three parts isopropyl alcohol (by weight).

An expanded PTFE membrane obtained from W.L. Gore & Associates Inc. having a nodes and fibril morphology (prepared according to U.S. Pat. No. 3,953,566) of nominal pore size 0.2 microns with an appropriate thickness of 60 microns was held under tension in a rectangular aluminum frame (20 inch$^2$ outside, 16 inch$^2$ inside). The frame contains a "tongue and groove" arrangement between the top and bottom plates to ensure that the membrane is held under tension throughout the process. The frames are held together using toggle clamps. The tensioned membrane contained within the internal dimensions of the frame is not in contact with any other surface.

The aqueous suspension was sprayed onto one side of the membrane using a Binks BBR spray gun. The spray coated membrane held within the frame was dried in an oven at 85° C. for 1 hour. The temperature was then increased over several hours to 350° C. and held at this temperature for 30 minutes to complete the baking process. After cooling, the toggle clamps are released and the porous composite material removed. The thickness of the composite was measured at 480 microns and therefore by subtraction, the layer of sintered porous PTFE sheet on the expanded membrane was 420 microns. The air flow rate (Gurley) and pore size distribution of the composite was determined and compared to the separate composite materials. The results are as follows:

| SAMPLE | THICKNESS (microns) | GURLEY (s/100 cm$^3$) | MIN. pore size (microns) | MAX. pore size (microns) | MEAN pore size (microns) |
|---|---|---|---|---|---|
| Expanded Membrane | 60 | 21–23 | 0.252 | 0.455 | 0.335 |
| 50%7A/ 50%7B Membrane Composite | 480 | 19–21 | 0.216 | 0.543 | 0.405 |
| 50%7A/ 50%9B Porous Sheet | 960 | 3–4 | 1.687 | 7.294 | 2.986 |

The density of the porous sheet was 1.03 g/cm$^3$.

It is clear from the results that the sintered porous PTFE layer (50%7A:50%9B) of the composite has no significant effect on the air flow rate of the membrane. This is due to the much higher air f low rate (lower Gurley value) of the sintered porous layer in comparison to the membrane. As expected, the pore size distribution of the composite closely resembles that of the membrane.

EXAMPLE 5
(Composite of 90%9B:10%PFA and Expanded Membrane)

The following proportions (% volume) of liquid formulations were blended together for 2 minutes using a Silverson mixing head:

20.9% Carboxymethyl cellulose solution
74.5% Water
3.6% Zonyl FSN-100 surfactant solution
1.0% Triethanolamine This mixture is known as the "surfactant concentrate". The carboxymethyl cellulose solution was prepared by dissolving carboxymethyl cellulose (which acts as a thickening agent) in water at a 1% (by weight) concentration. The Zonyl FSN-100 surfactant is a non-ionic perfluoroalkyl ethoxylate mixture. The Zonyl FSN-1 00 surfactant solution consisted of a mixture of four parts FSN-100, three parts water and three parts isopropyl alcohol (by weight).

100 g of Du Pont PFA (perfluoropropylvinylethertetrafluoroethylene copolymer), 90 og of "surfactant concentrate" and 20 g of food coloring dye are blended together for 60 seconds using a Waring blender to form a suspension. The dye is present as a visual aid in determining the surface finish of the spray coat. 900 g of DuPont granular PTFE resin grade 9B which has been milled to an average particle size of 55 microns was then added to the suspension which was reblended for 60 seconds. The resulting aqueous suspension was suitable for spray application.

An expanded PTFE membrane obtained from W.L. Gore & Associates Inc. having A nodes and fibril morphology of nominal pore size 0.2 microns with an approximate thickness of 60 microns was stretched over a ceramic tile and wrapped tightly over the edges of the tile to ensure that the membrane is held under tension.

The aqueous suspension was sprayed onto the membrane using a Binks BBR spray gun. The spray coated tile was dried in an oven at 70° C. for 2 hours. The temperature was then increased over several hours to 350° C. and held at this temperature for 2.5 hours to complete the baking process. After cooling, the resulting porous composite material was removed from the ceramic tile. The thickness of the composite was measured at 460 microns and therefore by subtraction, the layer of sintered porous PTFE sheet on the expanded membrane was 400 microns. The air flow rate (Gurley) and pore size distribution of the composite was determined and compared to the separate composite materials. The results are as follows:

| SAMPLE | THICK-NESS (microns) | GURLEY s/100 cm³ | MIN. Pore Size (microns) | MAX. Pore Size (microns) | MEAN Pore Size |
|---|---|---|---|---|---|
| Expanded Membrane | 60 | 30–36 | 0.196 | 0.352 | 0.269 |
| 90%9B/ 10%PFA Membrane Composite | 460 | 33–37 | 0.169 | 0.512 | 0.369 |
| 90%9B/ 10%PFA Porous Sheet | 920 | 1–2 | 3.312 | 13.61 | 5.937 |

The density of the porous sheet was 0.88 g/cm³.

Due to the relatively large pores present in the 90%9B: 10%PFA porous sheet and consequently, low Gurley values, the airflow rate of the composite is very similar to that of the membrane.

EXAMPLE 6
(Composite of 90%9B:10%CD509 and ExDanded Membrane)

100 g of I.C.I. modified PTFE fine powder CD509, 80 g of Zonyl FSN-100 surfactant solution and 1.4 kg of water are blended together for 60 seconds using a Waring blender to form a suspension. 900 g of DuPont granular PTFE resin grade 9B which had previously been milled to an average particle size of 40 microns, was added to the suspension and reblended for a further 60 seconds. The resulting aqueous suspension was suitable for spray application. The FSN-100 surfactant is a non-ionic perfluoroalkyl ethoxylate mixture. The FSN-100 surfactant solution consisted of a mixture of four parts FSN-100, three parts water and three parts isopropyl alcohol (by weight). CD509 is a fine powder type PTFE which also contains a comonomer (hexafluoropropylene) in a nominal amount of 0.1%.

An expanded PTFE membrane obtained from W. L. Gore & Associates Inc. having a nodes and fibril morphology with an approximate thickness of 60 microns was held under tension in rectangular aluminum frame (21.5 inch² outside, 18 inch² inside). The frame contains a "tongue and groove" arrangement between the top and bottom plates to ensure that the membrane is held under tension throughout the process. The frames are held together using toggle clamps. The tensioned membrane contained within the internal dimensions of the frame is not in contact with any other surface.

The aqueous suspension was sprayed onto one side of the membrane using a Binks BBR spray gun. The spray coated membrane held within the frame was dried in an oven at 105° C. for 5 hours. The temperature was then increased to 350° C. and held at this temperature for 30 minutes to complete the baking process. After cooling, the toggle clamps are released and the porous composite material removed. The thickness of the composite was measured at 360 microns and therefore by subtraction, the layer of sintered porous PTFE sheet on the expanded membrane was 300 microns. The air flow rate (Gurley) and pore size distribution of the composite was determined and compared to the separate composite materials. The results are as follows:

| SAMPLE | THICK-NESS (microns) | GURLEY s/100 cm³ | MIN. Pore Size (microns) | MAX. Pore Size (microns) | MEAN Pore Size (microns) |
|---|---|---|---|---|---|
| Expanded Membrane | 60 | 13–15 | 0.336 | 0.668 | 0.483 |
| 90%9B/ 10%CD509 Membrane Composite | 360 | 13–14 | 0.354 | 0.679 | 0.538 |
| 90%9B/ 10%CD509 Porous Sheet | 280 | 0–.6–0.8 | 4.246 | 13.17 | 5.953 |

The density of the porous sheet was 0.92 g/cm³.

It is clear from the results, that the sintered porous PTFE layer (90%9B: 10%CD509) of the composite has no significant effect on the air flow rate of the membrane. This is due to the much higher air f low rate (lower Gurley value) of the sintered porous layer in comparison to the membrane. As expected, the pore size distribution of the composite closely resembles that of the membrane.

EXAMPLE 7
(woven expanded PTFE layer)

A cover wick f or use in a photocopying machine of the general construction shown in FIG. 2 was prepared using expanded PTFE membrane in the form of a woven fabric (layer 4 in FIG. 1). The woven fabric is produced by forming tapes of expanded PTFE membrane into fibres and thereafter weaving the fibres into a fabric. Such fabric is available from W.L. Gore & Associates, Inc. under the trademark Rastex.

An aqueous suspension containing PTFE resin grade 7A was then sprayed onto the woven expanded PTFE fabric in the general manner described in Example 3. The woven fabric was held within an aluminum frame (described in Example 4), spray coated and then held at 50° C. for 1 hour. The temperature was then increased to 350° C. and held at this temperature for 30 minutes to complete the baking process.

After cooling, the composite material of approximately 1000 micron thickness, was removed from the frame and formed into a cover wick (nominal size 335 mm×50 mm) by stitching as described in conjunction with FIG. 2. The sintered porous PTFE layer exhibited good adhesion to the woven fabric, and also good toner wiping properties when used in a photocopier. The construction is particularly robust.

Testing and Preparative Methodologies (A) Preparation of PTFE grade 7A and 9B

TEFLON (trademark) granular-type PTFE fluorocarbon resin grades 7A and 9B are available from DuPont Speciality Polymers Division, Wilmington U.S.A. Grade 9B is a pre-melted sintered resin. The manufacturers product specification indicates an average density of 2.16, and an average particle size of 35 microns (grade 7A) and 500 microns (grade 9B prior to milling). PTFE grade 7A was unsintered and was used as supplied.

Prior to use, the PTFE grade 9B was milled to a volume average particle size of about 40 microns by grinding an aqueous slurry thereof between grinding stones at room temperature as follows.

The PTFE grade 9B was mixed with water to form a slurry, and the slurry fed between closely spaced grinding surfaces of-a grinding mill as disclosed in U.S. Pat. No. 4,841,623, to crush and shear the pieces of PTFE into particles. The ground slurry was then filtered or centrifuged to separate the granular PTFE particles from water, and the separated finely ground particles were oven dried at from 125° C–150° C.

(B1) Density

Unless otherwise stated, the density of the PTFE is determined by weighing a sample thereof in two different media, viz; air and water at room temperature. Water is a non-wetting medium for PTFE and consequently, the resulting density measurements refer to the porous PTFE. The weights were determined using an Avery VA124 analytical balance. The porous PTFE density is calculated as shown below:

$$\frac{\text{(Weight in Air)(Density of Water at Room Temperature)}}{\text{(Weight in Air} - \text{Weight in Water)}}$$

(B2) Porosity

% Porosity is determined from density measurements in wetting and non-wetting mediums i.e. isopropyl alcohol (IPA) and water respectively, as shown below:

$$\%\ \text{Porosity} = \frac{\text{(Density in IPA} - \text{Density in Water)} \times 100}{\text{Density in IPA}}$$

(C) Particle Size

Particle size of ground PTFE grade 9B was determined as follows: using a magnetic stirrer and ultrasonic agitation, 2.5 grams of milled PTFE powder were dispersed in 60 ml isopropyl were dispersed in 60 ml isopropyl alcohol. (Ultrasonic Probe Model W-385, manufactured by Heat Systems-Ultrasonics, Inc.).

Aliquots of 4–6 ml of the dispersed particles were added to approximately 250 ml of circulating isopropyl alcohol in a Leeds & Northrup Microtrac FRA Particle Size Analyzer. Each analysis consisted of three 30 second runs at a sample circulation rate of 2 litres/minute during which light scattering by the dispersed particles is automatically measured and the particle size distribution automatically calculated from the measurements.

(D1) Pore Size Measurement (bubble point)

Pore size of polytetrafluoroethylene was determined from the bubble point, defined in this specification as the pressure required to blow the first bubble of air detectable by its rise through a layer of liquid covering the sample. A test device, as outlined in ASTM F316-80, was used consisting of a filter holder, manifold and pressure gauge (maximum gauge pressure of 275.8 kPa). The filter holder consisted of a base, a locking ring, an o-ring seal, support disk and air inlet. The support disk consisted of a 150 micron mesh screen and a perforated metal plate for rigidity. The effective area of the test sample was 8.0 plus or minus 0.5 cm$^2$.

The test sample was mounted on the filter holder and wetted with anhydrous methanol until clarified. The support screen was then placed on top of the sample and the top half of the filter holder was tightened in place. Approximately 2 cm of anhydrous methanol at 21° C. was poured over the test sample. The pressure on the test sample was then gradually and uniformly increased by the operator until the first steady stream of bubbles through the anhydrous methanol were visible. Random bubbles or bubble stream of the outside edges were ignored. The bubble point was read directly from the pressure gauge.

The pore size of the test sample is related to the amount of gas pressure required to overcome surface tension and is given by a form of the Washburn equation:

where bubble point (psi)=K.4.y.cos T Id

K=shape factor

Y=surface tension of methanol

T=contact angle between pore and surface d=maximum pore diameter.

(D2) Pore Size Measurements (Coulter Porometer)

The pore size of the materials is determined by COULTER POROMETER II (trademark) which uses a liquid displacement technique. The sample is thoroughly wetted with a liquid of low surface tension and low vapor pressure, e. g. COULTER POROFIL, such that a the pores have been filled with the liquid. The wetted sample is subjected to increasing pressure, applied by a gas source. As the pressure is increased, the surface tension of the liquid is finally overcome and the liquid is forced out of the pores. By monitoring the gas pressure applied to the sample and the flow of gas through the sample when liquid is expelled, a "wet" run is obtained. The sample is then tested "dry" without liquid in the pores and a "dry" run is obtained. By comparing both "wet" and "dry" runs, the maximum (also called the bubble point), minimum and mean pore size can be calculated by the porometer using the Washburn equation, a form of which is shown in (D1).

In the case of laminated or composite materials, the sample gas pressure will be regulated by the material of smallest pore diameter which will effectively act as a pressure restrictor. Consequently, for composites of expanded PTFE membrane and porous granular PTFE, the pore size measurements will closely resemble that of the smallest pore diameter layer i.e. the expanded membrane.

(E) Oil Retention (i) The oil retention capacity of the porous PTFE materials was determined by a modification of ASTM D461-87.

The oil used was Dow Corning 200 silicone oil of viscosity 100 centistokes and a density of 0.96 g/cc.

Test samples of size 25 mm×150 mm were cut at random from sheet material. Each sample was weighed to the nearest 0.01 g. The samples were placed on the surface of a vessel which had been fitted with oil to a depth of 50 mm and allowed to sink under gravity to avoid air entrapment. The samples remained immersed for 3 hours. Thereafter each sample was removed from the oil and hung from a wire hook with the long dimension vertical to drain for 60 mins. A stirring rod was used to remove any visible drops of oil adhering to the sample before weighing the sample.

The oil retention was calculated according to ASTM D461-87 Section 21.6.1.

(F) Capillarity Test Method

A sample of PTFE sheet material is cut to dimensions 150 mm×12.5 mm and hung over an oil filled container with the long dimension of the sample in the vertical plane. The lower 6 mm of the sample is immersed in the oil at a temperature of between 18° C. and 22° C. The sample is left to soak for 5 hours so as to allow oil to be drawn upwards from the liquid. Thereafter, the distance from the surface of the oil in the container to the top of the oil front which has traveled up the sample is measured. The capillarity is presented in millimeters.

For the tests reported the oil was Dow Corning 200 silicone oil of viscosity 100 centistokes and a density of 0.96 g/cc.

The above Examples illustrate the production of various composites.

These composites are suitable for gas and liquid filtration membranes. As shown, the materials are air-permeable and suitable for filtering solid particles from gas streams, and have the necessary strength for liquid filtration applications.

What is claimed is:

1. A porous composite material formed substantially of polytetrafluoroethylene which comprises;
   expanded polytetrafluoroethylene (PTFE) membrane; and
   a layer of non-expanded porous polytetrafluoroethylene (PTFE) attached to the expanded PTFE membrane;
   the layer of non-expanded porous PTFE being a sintered PTFE network.

2. A material according to claim 1 wherein the sintered PTFE network layer is attached to the expanded PTFE membrane by being sintered thereto.

3. A material according to claim 1 wherein the layer of non-expanded porous PTFE is a sintered porous PTFE formed from PTFE particles, comprising granular-type PTFE, fused together to form a porous integral network of interconnected particles.

4. A material according to claim 3 wherein the granular-type PTFE is modified by the inclusion of a fluorinated organic polymer comonomer.

5. A material according to claim 4 wherein the sintered non-expanded porous PTFE layer comprises particles of granular-type PTFE and particles of thermoplastic fluorinated organic polymer fused to form said network.

6. A material according to claim 5 wherein the thermoplastic fluorinated organic polymer is fluorinated ethylene-propylene copolymer, or a copolymer of tetrafluoroethylene and perfluoropropyl vinyl ether.

7. A material according to claim 3 wherein the sintered non-expanded porous PTFE layer comprises particles of granular-type PTFE and unsintered fine powder PTFE fused to form said network.

8. A material according to claim 7 wherein the unsintered fine powder PTFE is modified by the inclusion of hexafluoropropylene comonomer.

9. A material according to claim 3 wherein the sintered non-expanded porous PTFE layer comprises particles of granular-type PTFE and particles of low molecular weight irradiated PTFE fused to form said network.

10. A material according to claim 1 wherein the layer of sintered porous PTFE is attached to the expanded PTFE membrane by a bonding material.

11. A material according to claim 1 in the form of a multiple layer structure, which comprises a layer of sintered porous PTFE between and attached to two expanded PTFE membranes.

12. A material according to claim 1 in the form of a multiple layer structure, which comprises a layer of expanded PTFE membrane between and attached to two layers of sintered porous PTFE.

13. A material according to claim 1 wherein the expanded PTFE membrane has a thickness of 50 to 500 microns; and the layer of non-expanded porous PTFE has a thickness of 50 to 1500 microns.

14. A material according to claim 1 wherein the porosity of the expanded PTFE membrane is in the range 50 to 95%.

15. A material according to claim 1 wherein the expanded PTFE membrane has been formed into fibres and woven into a fabric.

16. A material according to claim 1 wherein the density of the layer of non-expanded porous PTFE is in the range 0.6 to 1.5 g/cm$^3$.

17. A material according to claim 1 which does not shrink substantially at 200° C.

18. An oil transfer component for a copying machine which comprises the porous composite material of claim 1.

19. A filter for gas or liquid filtration which comprises the porous composite material of claim 1.

20. A porous composite material formed substantially of polytetrafluoroethylene which comprises:
   a woven fabric of fibres formed from expanded PTFE membrane; and
   a layer of non-expanded porous polytetrafluoroethylene (PTFE) attached to the expanded PTFE woven fabric; the layer of non-expanded porous PTFE being a sintered PTFE network.

21. A method of forming a porous composite material which comprises:
   providing an expanded PTFE membrane; and
   forming thereon a layer of sintered porous PTFE attached to the expanded PTFE membrane, the sintered porous PTFE being formed from PTFE particles, comprising granular-type PTFE, fused together to form a porous integral network of interconnected particles.

22. A method according to claim 21 wherein the layer of sintered porous PTFE is formed by coating the expanded PTFE membrane with a liquid dispersion comprising particles of granular-type PTFE and baking at an elevated temperature to form a porous integral network.

23. A method according to claim 22 wherein the liquid dispersion further comprises particles selected from:
   (i) unsintered fine powder PTFE,
   (ii) a thermoplastic fluorinated organic polymer,
   (iii) a low molecular weight PTFE
   (iv) mixtures thereof.

24. A method according to claim 22 wherein coating is achieved by spraying the liquid dispersion onto the expanded PTFE membrane.

25. A method according to claim 21 wherein the expanded PTFE membrane is held so as to prevent shrinkage or elongation during formation of the sintered porous PTFE layer.

26. A porous composite material formed substantially of polytetrafluoroethylene which comprises:

expanded polytetrafluoroethylene (PTFE) membrane; and a layer of sintered porous polytetrafluoroethylene (PTFE) formed from PTFE particles comprising granular-type PTFE fused together to form a porous integral network of interconnected particles formed in situ on said expanded PTFE membrane, said granular-type PTFE including a fluorinated organic polymer comonomer.

27. The porous composite material of claim 26, wherein the sintered PTFE layer comprises particles of granular-type PTFE and particles of thermoplastic fluorinated organic polymer fused to form said network.

28. A porous composite material formed substantially of polytetrafluoroethylene which comprises:

expanded polytetrafluoroethylene (PTFE) membrane; and a layer of sintered porous polytetrafluoroethylene (PTFE) formed from PTFE particles comprising granular-type PTFE and unsintered fine powder PTFE including hexafluoropropylene comonomer fused together to form a porous integral network of interconnected particles formed in situ on said expanded PTFE membrane, the layer of non-expanded porous PTFE being a sintered PTFE network.

* * * * *